United States Patent [19]
Utamura

[11] Patent Number: 5,675,188
[45] Date of Patent: Oct. 7, 1997

[54] ADJUSTABLE SPEED GAS TURBINE POWER GENERATION APPARATUS AND ITS OPERATION METHOD INDEPENDENT OF AMBIENT TEMPERATURE

[75] Inventor: Motoaki Utamura, Hitachi, Japan

[73] Assignee: Hitachi, Ltd., Tokyo, Japan

[21] Appl. No.: 262,973

[22] Filed: Jun. 21, 1994

[30] Foreign Application Priority Data

Jul. 23, 1993 [JP] Japan ................... 5-182426

[51] Int. Cl.$^6$ ............. F02C 7/057; F02C 6/18; H02K 7/18; H02P 9/14
[52] U.S. Cl. .............. 290/52; 290/40 C; 60/39.24; 60/39.182
[58] Field of Search ................. 290/40 R, 40 C, 290/40 B, 52; 322/31, 32, 61; 60/39.2, 39.282, 39.24, 39.182

[56] References Cited

U.S. PATENT DOCUMENTS

| | | | |
|---|---|---|---|
| 2,193,114 | 3/1940 | Seippel | 290/2 |
| 2,263,705 | 11/1941 | Seippel | 290/2 |
| 2,368,456 | 1/1945 | Edwards | 322/31 |
| 2,558,592 | 6/1951 | Starkey et al. | 290/2 |
| 2,854,617 | 9/1958 | Johnson | 322/32 |
| 4,015,187 | 3/1977 | Sasaki et al. | 290/40 C |
| 4,399,651 | 8/1983 | Geary, Jr. et al. | 60/39.02 |
| 4,452,048 | 6/1984 | Geary, Jr. et al. | 60/656 |
| 4,994,684 | 2/1991 | Lauw et al. | 290/52 |

FOREIGN PATENT DOCUMENTS

| | | |
|---|---|---|
| 83616 | 5/1982 | Japan . |
| 239777 | 10/1988 | Japan . |

*Primary Examiner*—Steven L. Stephan
*Assistant Examiner*—Christopher Cuneo
*Attorney, Agent, or Firm*—Antonelli, Terry, Stout & Kraus, LLP

[57] ABSTRACT

An adjustable speed gas turbine power generation apparatus can maintain a rated output of the gas turbine generation apparatus irrespective of ambient temperature change. For this purpose, the rotational speed of the secondary winding of the generator is controlled by the gas turbine and alternating current excitation of the secondary winding is determined on the basis of the ambient temperature. The sucked air quantity (flow rate by weight) in the compressor can be increased by increasing the rotational speed of the gas turbine when the ambient temperature increases, so that an output from the gas turbine becomes nearly the rated output, while maintaining the desired frequency at the primary winding.

15 Claims, 4 Drawing Sheets

ADJUSTABLE SPEED GAS TURBINE POWER GENERATION APPARATUS AND ITS OPERATION METHOD INDEPENDENT OF AMBIENT TEMPERATURE

BACKGROUND OF THE INVENTION

The present invention relates to an adjustable speed gas turbine power generation apparatus, and more particular to an adjustable speed gas turbine power generator and its method of operation in which a gas turbine and a generator are coupled by one common shaft, whose rotational speed is changeable.

A gas turbine power generation apparatus comprises a compressor for intaking and compressing air, a combustor for combusting fuel with the compressed air to produce combustion gas, a gas turbine driven by the combustion gas generated by the combustor and a power generator, wherein the compressor and the power generator are driven by the gas turbine, which is connected by one drive shaft with the power generator and the compressor.

In the gas turbine power generation apparatus of this type, since the power generator is connected to an electric power transmission system, a synchronous power generator is used so as to ensure synchronism with the frequency of the power transmission system. Accordingly, the rotational speed of the drive shaft of the power generator is constant and the frequency of the power generator is proportional to that of the transmission system.

In a gas turbine power generation apparatus, air is taken into the compressor, by which the air is compressed. Therefore, if there is an increase in the air temperature from a designed operation temperature at which a rated output may be obtained, the output of the gas turbine power generation apparatus decreases. That is, the gas turbine has such characteristics that, as the air temperature rises, the output of the power generator decreases. For a gas turbine so designed that the maximum output is obtained at 4 degrees Centigrade, for example, an output of the gas turbine power generator at 40 degrees Centigrade becomes 90% of the rated output.

The reason for this is that the actual quantity of the air (so-called suction quantity of air in terms of flow rate by weight) taken into the compressor becomes smaller as the temperature rises, and because the amount of fuel to be supplied to the combustor is lowered to keep the fuel-to-air ratio constant.

SUMMARY OF THE INVENTION

An object of this invention is to provide an adjustable speed gas turbine power generation apparatus and a method of operation of the power generation apparatus that can maintain a high output of the gas turbine power generator at an elevated ambient temperature, and to maintain the frequency of the output to a value which is substantially the same as that of the transmission system.

In accordance with the present invention, an induction power generator is used as a power generator that is driven by the gas turbine. In order to maintain the frequency of the output from the primary winding of the stator of the power generator at the same level as that of the power transmission system, the rotational speed of the secondary winding of a rotor of the power generator can be changed in accordance with the ambient temperature by controlling the frequency of the alternating current excitation of the secondary winding of the rotor of the power generator, so that the rotational speed of the secondary winding can be changed.

The adjustable speed gas turbine power generation apparatus of this invention comprises a compressor for intaking and compressing air to produce compressed air, a combustor for combusting fuel with the compressed air to produce combustion gas, a gas turbine driven by the combustion gas and a power generator connected to the compressor and the gas turbine by the same drive shaft, a primary winding of the power generator being connected to a transmission system and a secondary winding being connected to an alternating current excitation apparatus. The amount of fuel to be supplied to the combustor is controlled by a fuel controller in accordance with a load demand signal. The alternating current excitation apparatus is controlled by an excitation control device in accordance with the load demand signal and an air temperature signal.

Further, the frequency of the alternating current excitation quantity of the secondary winding of the power generator is controlled according to the ambient temperature so that the rotational speed of the drive shaft, to which the secondary winding is connected, may be controlled to permit induction of air at variable temperatures while maintaining a constant output of electrical power.

The present invention also provides an operation method for an adjustable speed gas turbine power generation apparatus which comprises taking-in and compressing air using a compressor, combusting fuel with the compressed air using a combustor to produce combustion gas, driving a gas turbine connected to the compressor by the same drive shaft, using the combustion gas, driving a power generator which is connected to the gas turbine by the same drive shaft and whose primary winding is connected to a power transmission system and whose secondary winding is connected to an alternating current excitation apparatus, wherein the rotational speed of the drive shaft is increased by such a degree that the output of the gas turbine power generator is increased to a desired level.

It is desirable that, when the output of a power generator driven by a gas turbine is lowered due to a temperature rise in the intake air, which leads to a decrease in the actual quantity by weight of the intake air, the rotational speed of the drive shaft of the gas turbine is periodically increased in response to an ambient temperature signal and a load demand signal, which are given by a power supply command center to a power station. As a result, the amounts of intake air and supplied fuel are increased to increase the output of the gas turbine power generator. Further, when the ambient temperature is lower than the prescribed temperature, the rotational speed of the drive shaft is lowered to maintain the output frequency at a constant level.

Since frequency adjustment of the excitation and control of the amount of intake air and fuel-to-air ratio are all controlled by electrical signals, the response time of the gas turbine power generation apparatus is quite short.

Even if the temperature of the intake air in the compressor changes, the intake air quantity (flow rate by weight) can be kept almost constant by changing the rotational speed of the drive shaft to which the secondary winding of the generator is fixed in response to a signal indicative of the air temperature while changing the excitation frequency to maintain constant frequency output electrical power.

The present invention is applicable to a gas turbine power generation apparatus of the so-called combined cycle system type where the gas turbine power generation apparatus and a heat recovery steam turbine power generation apparatus are combined.

DETAILED DESCRIPTION OF THE PREFERRED EMBODIMENTS

Figure 1:
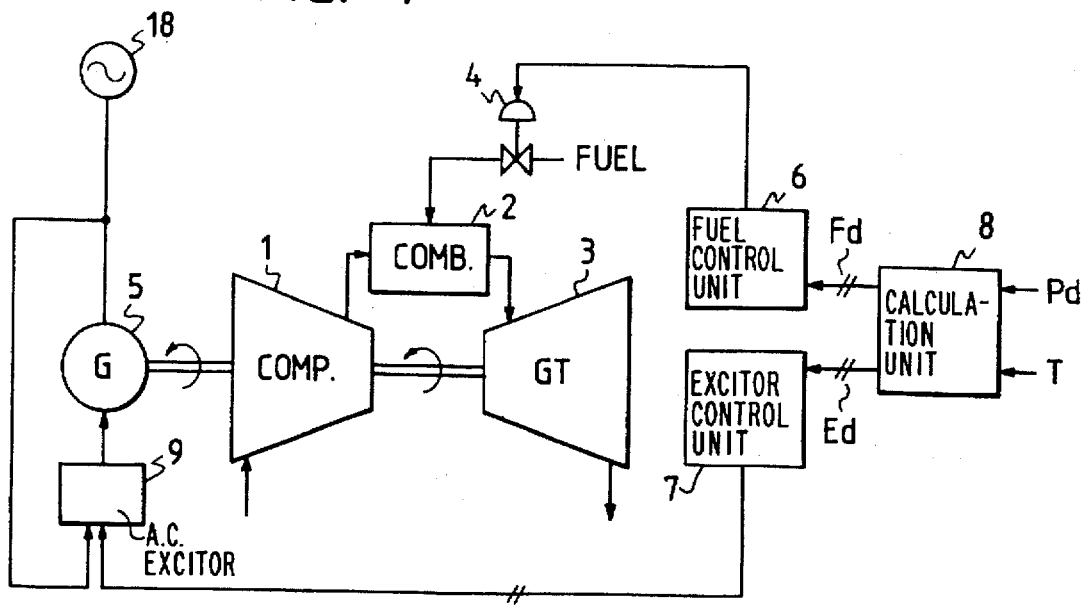
FIG. 1 is a block diagram showing an example of an adjustable speed gas turbine power generation apparatus according to the present invention.

FIG. 1 shows an example of the adjustable speed gas turbine power generation apparatus of this invention, which comprises compressor 1 for compressing intake air, a combustor 2 for combusting fuel and the compressed air at a prescribed fuel-to-air ratio, a gas turbine 3 driven by the combustion gas, and an adjustable speed power generator 5 driven by the gas turbine. Compressor 1 and the adjustable speed power generator 5 are connected to the gas turbine 3 by one shaft.

Numeral 4 identifies a fuel supply apparatus which operates feed fuel to the combustor 2, 18 represents a power transmission system, and 9 represents an alternating current excitation apparatus for exciting a secondary winding of the adjustable speed type power generator 5 with an alternating current excitation.

In order to operate the adjustable speed gas turbine power generator of the present invention, a load demand signal Pd from the power supply command center, etc. and an ambient temperature signal T detected by an ambient temperature detector are inputted into calculation unit 8. Demand value Fd of the fuel quantity and demand value Ed of the alternating excitation current of the secondary Winding of the adjustable speed power generator 5 are determined by the calculation unit 8 in accordance with the power demand signal Pd and detected temperature signal T.

The objective value Fd is inputted into a fuel controller 6 to adjust the opening degree of the fuel feeding controller 4, thereby to control the fuel amount supplied to the combustor 2.

Demand value Ed of the alternating current excitation is inputted into excitation control unit 7 to control the alternating current exciter 9. Thus, the alternating current exciter 9 determines an alternating excitation current for the generator 5, the frequency, amplitude and phase etc.

Figure 2:
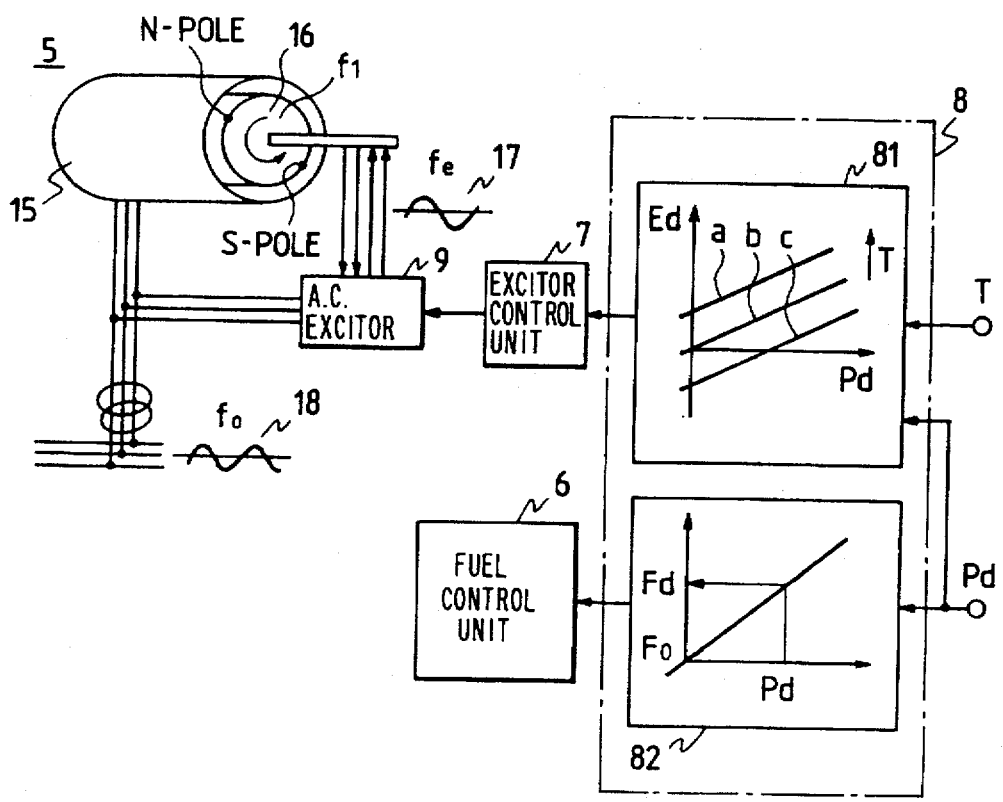
FIG. 2 is a diagram which shows a detailed arrangement of the gas turbine power generation apparatus of FIG. 1, which comprises a calculation unit and an adjustable speed gas turbine power generator.

This alternating current exciter 9 is an apparatus for producing a three-phase alternating excitation current in accordance with the calculation unit 8 which, in a preferred embodiment, uses a function generator 81 as illustrated in FIG. 2. Well-known converters, such as a cycloconverter, a GTO (gate turn off) element, etc. can be used as the alternating current exciter 9.

Although in the above description, the ambient temperature T is inputted into the calculation unit 8 every time temperature signals are determined in such a manner that several temperature ranges are set beforehand, the speed control of the shaft and excitation control of the secondary winding can be conducted in response to the load demand signal without detecting air temperature T each time. Therefore, in accordance with the present invention, the phrase "in response to the load demand signal and air temperature" refers to case where Pd and T are detected and inputted into calculation unit and/or T is not detected every time, but prescribed T values are used as a temperature signal.

An outline of the adjustable speed gas turbine power generation apparatus of the present invention is explained by reference to FIG. 2.

The adjustable speed gas turbine generation apparatus comprises an adjustable speed type generator 5 which has basically the same function as the generator used in an adjustable speed pumped storage, where electricity is generated by water pumped up to an upper level by using electric power at night. Speed-adjustable generator 5 has a primary winding 15 connected to an electric power transmission system 18 and a secondary winding 16 which is rotated by the drive shaft of the gas turbine in FIG. 1.

The secondary winding 16 is excited with a variable frequency alternating excitation current by the AC excitor 9. The fuel control unit is identified by numeral 6. The excitor 9 is connected to one end thereof to the power source of the electric power transmission system.

In the adjustable speed generator 5, the frequency of the primary winding 15 is f0, which corresponds to that of the power transmission system. If a frequency proportional to the rotational speed of the drive shaft of the generator is set to f1 and the excitation frequency of the secondary winding is set to fe, there is the following relationship among these parameters.

$$f0 = f1 + fe$$

Since fo is normally constant, f1 can be changed by changing fe. A change of excitation frequency fe of the secondary winding 16 changes the output frequency fo in accordance with the above equation. As a result, the suction quantity of air by compressor 1 can be controlled by changing the shaft speed to induct differing density air occurring at temperatures different than the temperature at which the rated electrical output occurs, e.g. 4° C., and making a corresponding change in the excitation frequency fe to produce constant frequency output power. The present invention adopts this principle.

Even if the ambient temperature changes, the output of the gas turbine is kept at substantially the rated output, while keeping the output frequency of the generator constant. The demand value Fd of the fuel quantity and the demand value Ed of the alternating current excitation of the secondary winding 16 of the adjustable speed generator are determined by calculation unit 8, as shown in FIG. 2.

Figure 3:
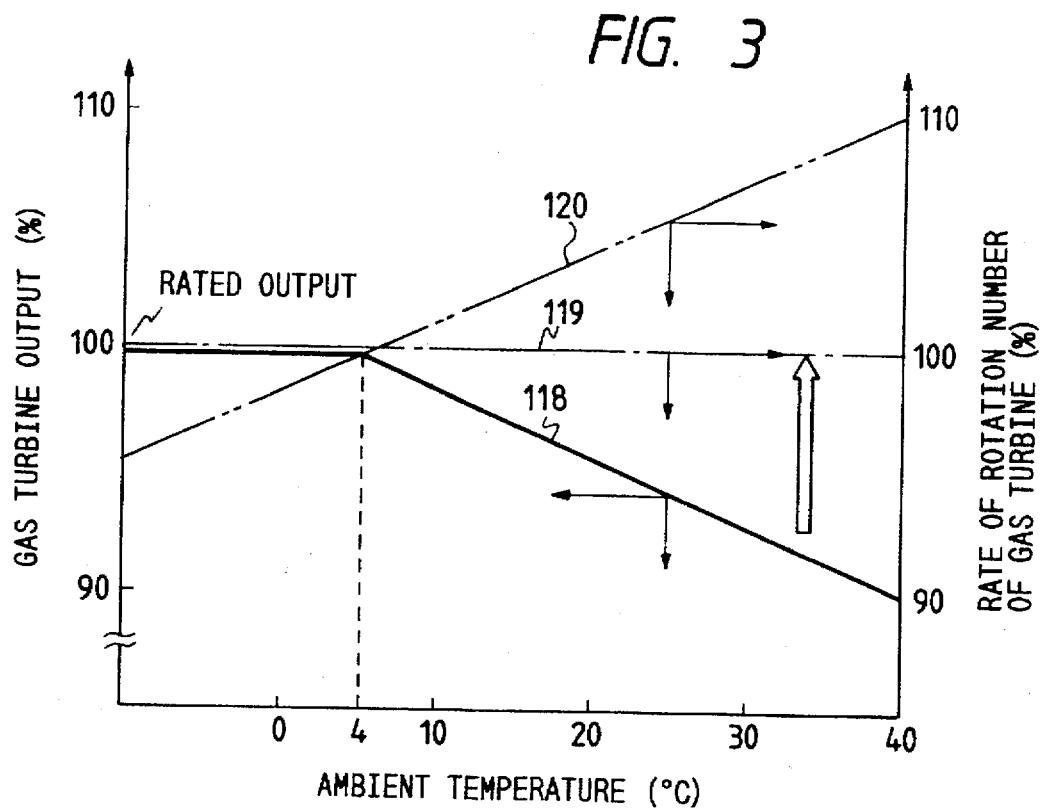
FIG. 3 is a characteristic diagram for explanation of the operating mechanism of a gas turbine system.

The relationship between the output and the ambient temperature of the gas turbine is explained here by reference to FIG. 3. In FIG. 3, there is shown a relationship among the outputs of the gas turbine on the ordinate and the ambient temperature on the abscissa. As well known, output 118 of the gas turbine changes with changes in the ambient temperature, that is, as the ambient temperature increases, the output of the gas turbine decreases. As a compressor and a gas turbine are so designed to be operated at a constant rotational speed in the conventional system, the volume flow rate of the air sucked into the compressor is constant. Therefore, when the ambient temperature increases, the mass flow rate of air decreases and the fuel amount also decreases so that the output of the gas turbine decreases.

The mass flow rate is determined by multiplying the volume flow rate and density, which is parameter of ambient temperature. As the density of the air reduces at higher temperatures, the mass flow rate of air decreases as temperature increases. The normal output (i.e. rated output or designed output which is permitted by authority) of the gas turbine is usually defined as an output at a specific temperature such as 4 degrees Centigrade. Therefore, it is generally impossible to obtain the rated output in higher temperature seasons, particularly in summer seasons.

Since, in accordance with the present invention, the rotational speed of the gas turbine is increased as shown by line 120 in response to changes in the ambient temperature and the load demand signal, the volume of air sucked in by the compressor and the fuel amount to be supplied to the combustor are increased, keeping a prescribed fuel-to-air ratio. And, the output of the gas turbine is increased up to the rated output, as shown by characteristic line 119.

In this manner, the mass intake airflow taken-in by the compressor is kept substantially constant, regardless of the ambient temperature.

In order to realize a gas turbine power generation apparatus having characteristic 119, calculation unit 8 is employed which has two sets of function generators 81 and 82, as shown in FIG. 2. Load demand signal Pd is input into function generator 82 for calculating the demand value Fd of the fuel quantity (fuel flow rate). Characteristics a, b and c . . . , which show the relationship among prescribed frequency, load demand Pd, and ambient temperature T are determined in advanced. Then, characteristics a, b, c, . . . which are related to load demand signal Pd and excitation quantity Ed of the secondary winding are input into the function generator 81.

Because the load demand signal and the demand value of the fuel quantity are almost proportional to each other, the demand value Fd of the fuel quantity can be determined. Demand value Fd of the fuel quantity can be determined by conventional calculation methods for a fuel quantity in the control unit. Demand value Ed of the excitation current of the secondary winding 16 of the adjustable speed generator is determined by load demand signal Pd and ambient temperature signal T.

The rotational speed of adjustable speed generator 5 is determined by demand value Ed of the alternating excitation current. For example, when the ambient temperature is 4 degrees Centigrade, the gas turbine is operated in accordance with the line b, where the load demand signal Pd is 0 and the frequency is 50 Hz. The rotational speed of the drive shaft is controlled to maintain the load Pd and the frequency at 50 Hz.

With an increase or a decrease in load, the rotational speed of the drive shaft is increased or decreased in response to an appropriate command. If the ambient temperature is higher than a prescribed value, such as 4 degrees Centigrade, a command is given to increase the amount of air sucked in by the compressor which is accomplished by increasing the rotational speed of the drive shaft. This occurs in response to a command given to increase the excitation current of the secondary winding.

If the ambient temperature becomes lower than a temperature, such as 40 degrees Centigrade, but higher than 4 degrees Centigrade, a command is given to set the rotational speed (rotation number) according to a characteristic line (not shown) between lines a and b. A demand value Ed (demand value of the rotational speed) of the alternating current excitation quantity is input into the excitation control unit 7. In order to realize this demand value, the slip frequency of the adjustable speed generator 5 is controlled in accordance with the equation above.

For example, the frequency fo of the electric power system can be determined to be 50 Hz as the rated frequency in the expression fo=f1+fe.

The demand value Ed of the rotational speed corresponds to frequency f1 which is equivalent to the rotational speed of the drive shaft of adjustable speed generator 5. When this value is 55 Hz, the alternating current excitation quantity of the secondary winding is controlled to make the excitation frequency (slip frequency) fe of the secondary winding minus 5 Hz. The minus value means that the direction of the magnetic flux is reversed.

The three-phrase alternating excitation current of the secondary winding 16 including the required frequently is determined by the exciter 9. Thus, when adjusting active power as the load demand signal Pd is adjusted, only the phase angle of the three-phase alternating current excitation current is controlled, and when the reactive power or in other words output voltage is adjusted as the load demand signal Pd, only the amplitude of the three-phase alternating excitation current is controlled.

According to the above control method, combustion is carried out by feeding fuel in accordance with the load demand signal Pd. Further, the drive shaft of the compressor connected to the generator is rotated at a speed which is determined by taking into consideration the ambient temperature change, and an appropriate amount of air is taken-in in proportion to the load demand signal Pd. Therefore, a desired high output is obtained from the gas turbine generator, while maintaining a constant frequency by controlling the slip frequency fe in accordance with the above description.

Figure 4:
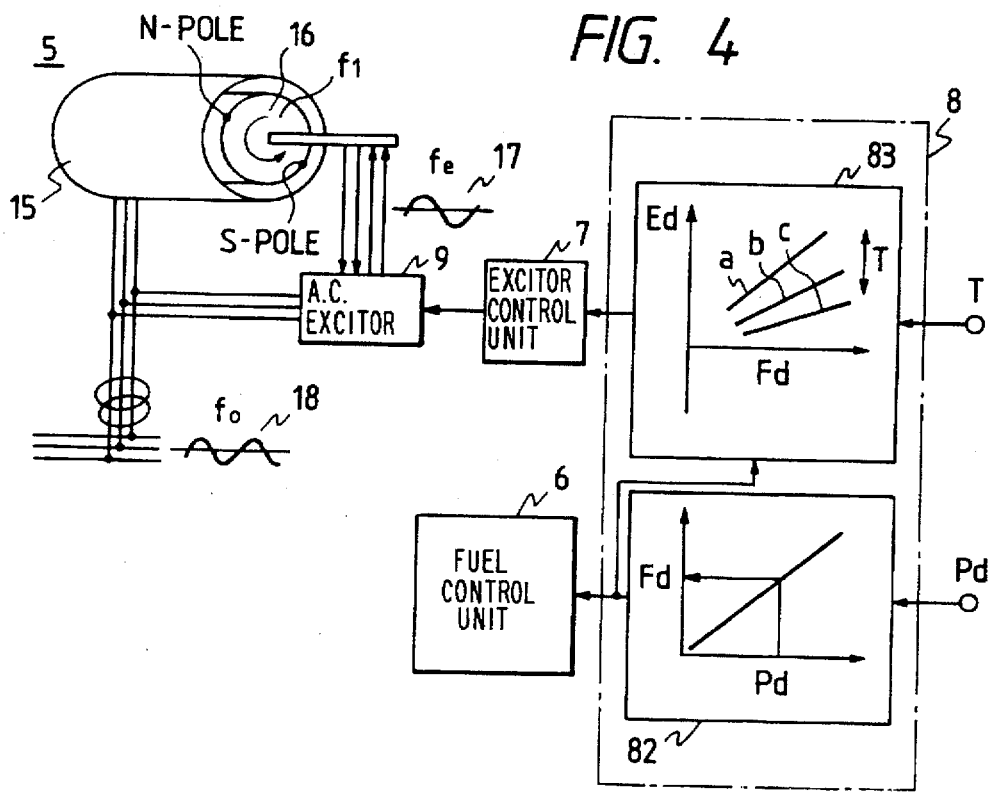
FIG. 4 is a diagram which shows a detailed arrangement of the gas turbine power generator according to another example.

FIG. 4 shows another example of this invention. In the arrangement of function generator 83 in this example, calculation unit 8 is different from that of FIG. 2. Function generator 82 determines a demand value Fd of the fuel quantity from the load demand signal Pd. In addition, function generator 83 determines a demand value Ed of the alternating current excitation quantity including the required frequency fe in accordance with the ambient temperature T, and the demand value Fd of the fuel quantity. The demand values can be determined by various methods. The same numerals shown in FIG. 4 are used in FIG. 2 to represent the same elements.

Figure 5:
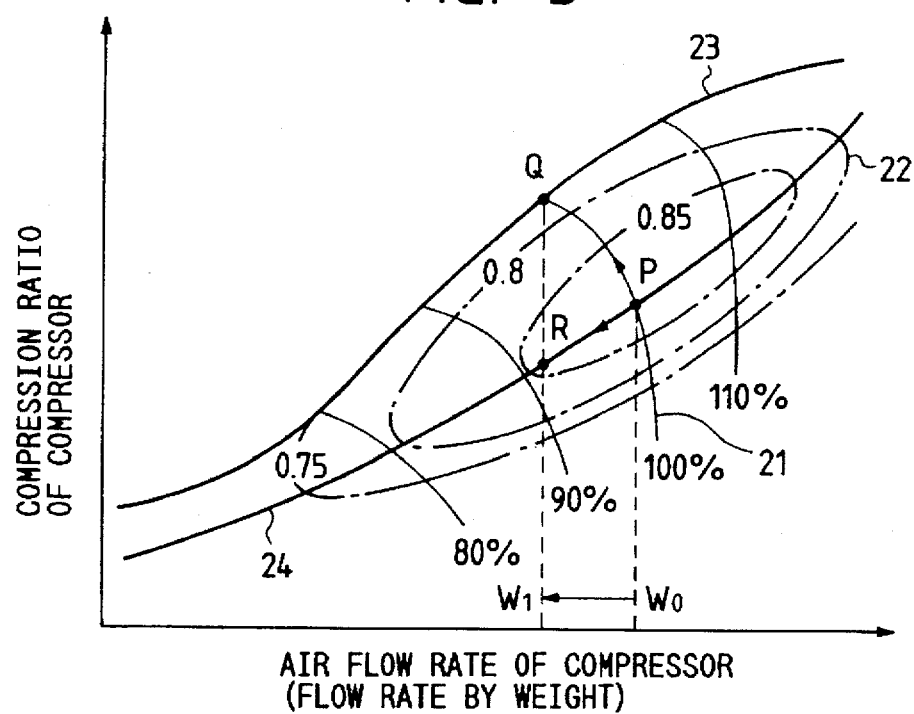
FIG. 5 is a graph showing characteristics of a compressor used in the present invention under partial load operation.
Figure 6:
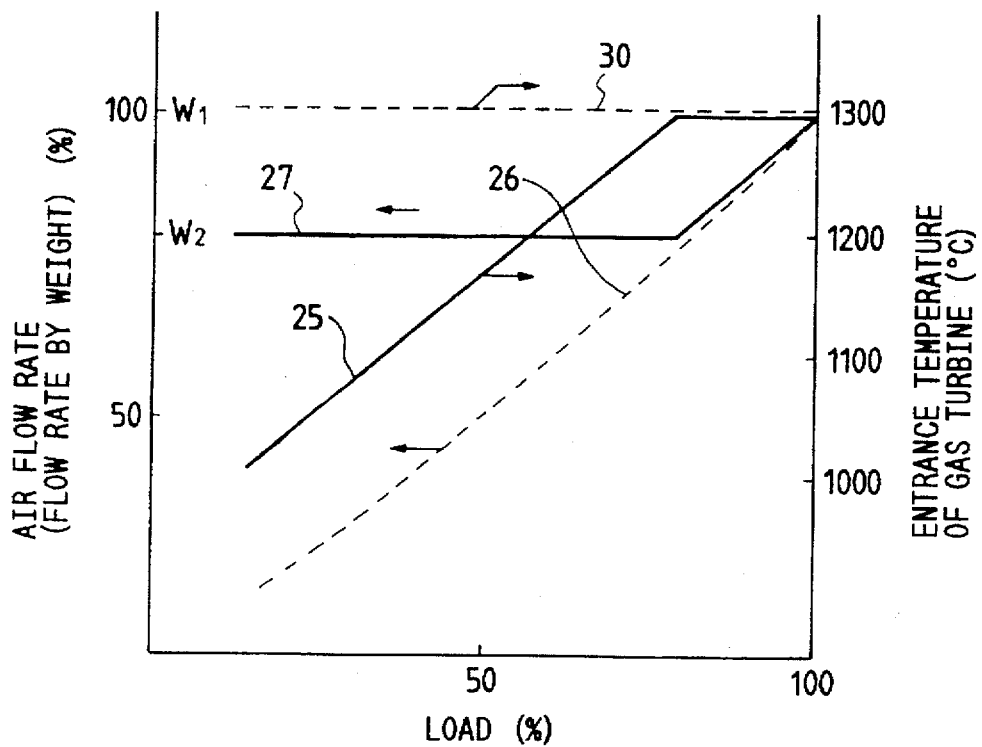
FIG. 6 is a characteristic diagram of the relation between load, an air flow rate and a gas turbine entrance temperature.

There is another important advantage of the present invention. This advantage will be explained in detail with reference to FIGS. 5 and 6. FIG. 5 shows the relation between air flow rate (flow rate by mass) on the abscissa and pressure ratio of the compressor on the ordinate. FIG. 6 shows the relation between load rate (%) and air flow rate (flow rate by mass) on the left ordinate and gas turbine entrance temperature on the right ordinate. In a gas turbine system, its thermal efficiency during partial load operation is lower than that of full load operation, as seen from FIG. 5. The internal efficiency 22 of the compressor is shown in a family of elliptic contours which increase from 0.75 to 0.85 with a decrease in the area of the family of ellipses where rated operating point P is in the center.

The line connecting the smallest changes in efficiency with regard to the state change of the compressor is referred to as the working line 24. The compressor is operated along the working line 24 to obtain the highest efficiency. The efficiency of the compressor is highest when the compressor is operated on this working line 24, so that the compressor is operated with good stability.

The rotational speed of the drive shaft of the compressor is kept constant during conventional operation at partial load.

If the rotational speed of the drive shaft of the compressor is kept constant as in the conventional method, the operating point of the compressor, following a decrease in the air flow rate, moves to the upper part along equi-rotation number line 21 so that the reduction of the internal efficiency of the compressor becomes the largest.

With reduction of the load, the operating point of the compressor comes close to surge line 23, representing the stability limit above which a surge phenomenon will occur in the compressor. The air flow rate of air sucked in by the compressor can not be made smaller than air flow rate W1 defined at point Q, which is a crossing point of the equi-rotation-number line 21 and surge line 23.

On the other hand, the necessary and sufficient amount of air for combustion decreases as the load decreases. Therefore, only part of the air sucked in by the compressor contributes to combustion in a range of load lower than point Q. The remaining part of the air is admixed with combustion gas without being warmed. As a result, the temperature of the combustion gas at the gas turbine entrance drops, and the thermal efficiency of the gas turbine is reduced. Because the rate of the air that contributes to the combustion is reduced in proportion to reduction of the load, the thermal efficiency of the gas turbine is reduced with reduction of the load. W0 in FIG. 5 is the air flow rate at point P, and W1 is the air flow rate at point Q. According to the partial load operation by the present invention, the air flow rate W0 can be reduced to W1 by lowering the rotational speed of the drive shaft without incurring any problem, such as surge.

FIG. 6 shows the above relation. As is seen by the characteristic lines 25, 27 (solid lines) representing the conventional operation, the temperature of the combination gas at the gas turbine entrance rises as load increases. When the load is above 75–80%, the temperature of the combustion gas becomes almost constant at about 1300 degrees Centigrade. The air flow rate is W2 when the load is lower than 75%, which is lower than W1. When the load is 80% or more, the air flow rate becomes close to W1. That is, the conventional method does not satisfy the load demand and, therefore, produces a low thermal efficiency.

Characteristic lines 26, 30 (dotted lines) in FIG. 6 show the operation of the present invention. The temperature of the combustion gas at the gas turbine entrance becomes almost constant at about 1300 degrees Centigrade regardless of a change in the load. The air flow rate increases to around W1 as the load rises. The air flow rate is proportional to load. Therefore, the operation of the present invention has good load dependency.

According to the present invention, when the load decreases, the rotational speed of the compressor is lowered the air flow rate is reduced and the slip frequency fe is increased, in response to the characteristics of function generator 81 or 83 of calculation unit 8. Operating point R shown in FIG. 5 moves along working line 24, so that a high internal efficiency of the compressor can be maintained.

The air flow rate in the compressor is not limited in the present invention, because an appropriate amount of air can be taken into the compressor in proportion to a certain amount even in a low load range. As a result, as shown in FIG. 6 by characteristic line 26, the temperature of the combustion gas at the gas turbine entrance does not decrease in the low load range, and the thermal efficiency of the gas turbine can be maintained almost equally with that in the high load range. That is, a thermal efficiency which is nearly the same efficiency as the rated value can be acquired in the large load range.

The present invention is applied to a combined cycle system comprising a gas turbine power generation apparatus, which comprises a gas turbine, a compressor, a combustor and a first power generator; a heat recovery steam generator for recovering heat discharged from the gas turbine; a steam turbine driven by steam heated by the recovered heat; and a second power generator driven by the steam turbine, the gas turbine power generation apparatus comprising:

a compressor for intaking and compressing air;

a combustor for combusting fuel with the intake air to generate combustion gas;

a gas turbine driven by the generated combustion gas;

a fuel control device for controlling the amount to be supplied to the combustor in response to a load demand signal;

the first power generator having a primary winding connected to a power transmission system and a secondary winding which is excited with alternating current;

the improvement wherein the first power generator is connected to said gas turbine by a single drive shaft, and the rotational speed of the drive shaft is controlled to increase the output of the gas turbine in response to the load demand signal and ambient temperature.

According to the present invention, a very high output of power from the gas turbine power generation apparatus can be expected, while maintaining a desired output frequency. Further, a high thermal efficiency of the gas turbine is maintained during operation at partial load.

Figure 7:
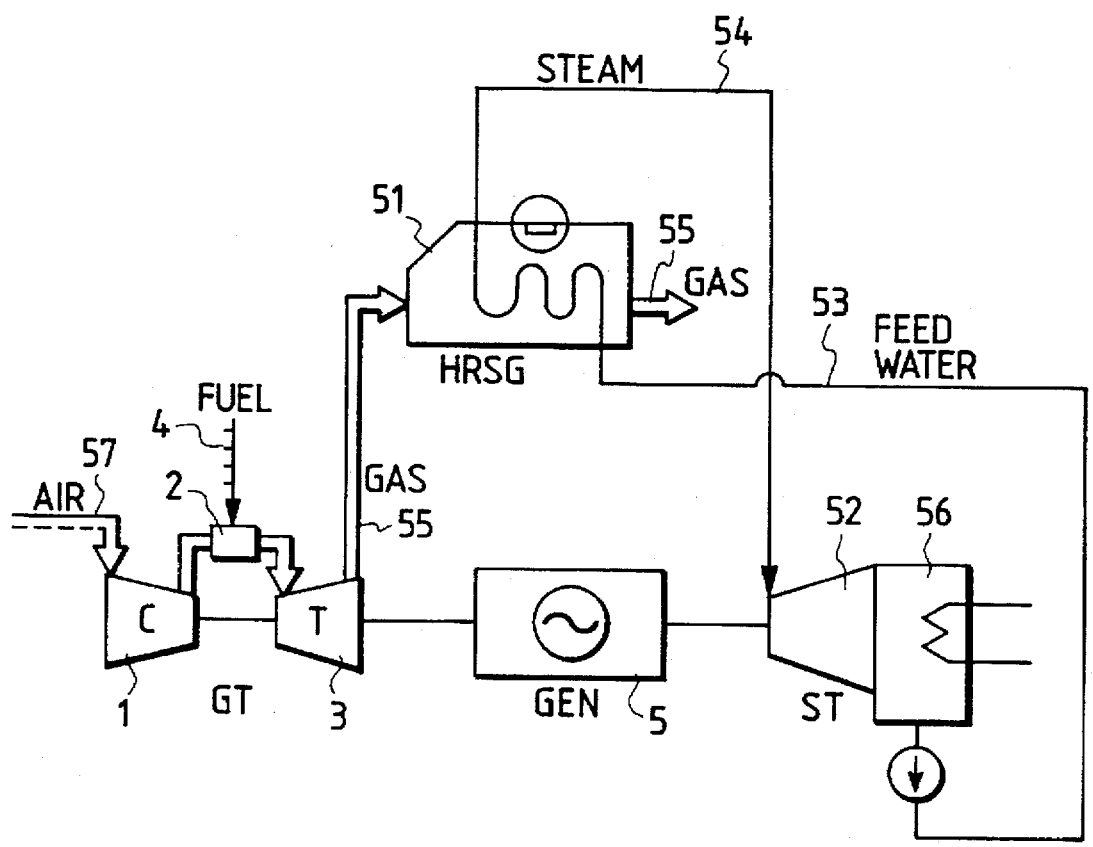
FIG. 7 is a diagram which shows a construction of a combined cycle system of the single shaft type.

The construction of the combined cycle system of the present invention is explained with reference to FIG. 7. The main components of the system are a gas turbine apparatus, a steam turbine apparatus and a power generator. In the case of FIG. 7, these components are all connected by one drive shaft (so-called single shaft type), but the gas turbine apparatus and steam turbine apparatus can be connected to different power generators (so-called multi-shaft type). Air 57 taken-in and compressed by the compressor 1 is converted by the combustor 2 to a high temperature, and high pressure gas is sent to the gas turbine 3 where part of the heat energy is converted into work, which is changed by power generator 5 to electric energy. Exhaust heat 55 from the gas turbine is recovered by heating feed water 53 in a heat recovery steam generator 51, thereby to generate steam 54. The thus generated steam 54 is introduced into steam turbine 52 to do work and rotate generator 5, thereby to generate electricity. Steam having performed work is converted into water in condenser 56, and the water is fed to heat recovery steam generator 51 as feed water. Exhaust gas 55 from heat recovery boiler 51 is released in to a chimney.

Further, a quicker adjustment of the output of the gas turbine in response to load demand is expected than with conventional adjustment, because the adjustment of the present invention is carried out by processing electrical signals.

What is claimed is:

1. An adjustable speed gas turbine power generation apparatus comprising:

a compressor for intaking and compressing air;

a combustor for combusting fuel with the intake air from the compressor to generate combustion gas;

a gas turbine driven by the generated combustion gas;

a fuel control device for controlling an amount of fuel to be supplied to the combustor in response to a load demand signal;

a power generator having a primary winding connected to a power transmission system and a secondary winding which is excited with alternating current; and wherein the generator and compressor are connected to said gas turbine by a drive shaft; and the power generator is an adjustable speed power generator operating in accordance with the equation fe=fo−f1 wherein fe is a slip frequency of the generator equalling a frequency of excitation current applied by the alternating current excitation device to the secondary winding, fo equals the frequency of electrical current produced by the primary winding and f1 is the frequency of the drive shaft, and an alternating current excitation device is coupled to the secondary winding for controlling the slip frequency fe as a function of the ambient temperature to increase with decreasing ambient temperature.

2. The adjustable speed gas turbine power generation apparatus in accordance with claim 1 wherein:

the alternating current excitation device also controls the slip frequency fe as a function of the load demand signal.

3. The adjustable speed gas turbine power generation apparatus in accordance with claim 1 wherein:

the compressor operates with an internal efficiency above 0.8.

4. The adjustable speed gas turbine power generator apparatus of claim 1 wherein:

the slip frequency fe is also a function of the load demand signal.

5. A method of operating an adjustable speed gas turbine power generation apparatus having a compressor for intaking and compressing air, a combustor for combusting fuel with the intake air to generate combustion gas, a gas turbine driven by the generated combustion gas, a fuel control device for controlling an amount of fuel to be supplied to the combustor in response to a load demand signal, a generator having a primary winding connected to a power transmission system and a secondary winding which is excited with alternating current, wherein the generator is connected to said gas turbine by a drive shaft with the power generator being a variable speed power generator operating in accordance with the equation fe=fo−f1 wherein fe is a slip frequency of the generator equalling a frequency of excitation current applied by an alternating current excitation device to the secondary winding, fo equals the frequency of electrical current produced by the primary winding and f1 is the frequency of the drive shaft, the method comprising the steps:

controlling the rotational speed of the power generator in response to at least the ambient temperature of the air and a load demand signal and controlling the slip frequency fe with an alternating current excitation device as a function of the ambient temperature to increase with decreasing ambient temperature.

6. The method of operating an adjustable speed gas turbine power generation apparatus in accordance with claim 5 further comprising:

controlling the slip frequency fe with the alternating current excitation device as a function of the load demand signal.

7. The method of operating an adjustable gas turbine power generation apparatus in accordance with claim 5 further comprising:

operating the compressor with an internal efficiency above 0.8.

8. The method of operating an adjustable speed gas turbine generation apparatus in accordance with claim 5 wherein:

the slip frequency fe is also a function of the load demand signal.

9. A combined cycle system comprising:

a gas turbine power generation apparatus;

a heat recovery steam generator for recovering heat discharged from the gas turbine power generation apparatus;

a steam turbine driven by a steam heated by the recovered heat from said heat recovery system generator; and a second power generator driven by the steam turbine;

said gas turbine power generation apparatus comprising:

a compressor for intaking and compressing air;

a combustor for combusting fuel with the intake air from the compressor to generate combustion gas;

a gas turbine driven by the generated combustion gas;

a fuel control device for controlling an amount of fuel to be supplied to the combustor in response to a load demand signal;

a power generator having a primary winding connected to a power transmission system and a secondary winding which is excited with alternating current; and wherein said power generator is connected by a drive shaft to said gas turbine; and the power generator is a variable speed power generator operating in accordance with the equation fe=fo−f1 wherein fe is a slip frequency of the generator equalling a frequency of excitation current applied by an alternating current excitation device to the secondary winding, fo equals the frequency of electrical current produced by the primary winding and f1 is the frequency of the drive shaft, the alternating current excitation device controlling the slip frequency fe as a function of the ambient temperature to increase with decreasing ambient temperature.

10. The combined cycled system in accordance with claim 9 wherein:

the compressor operates with an internal efficiency above 0.8.

11. The combined cycle system in accordance with claim 9 wherein:

the slip frequency fe is also a function of the load demand signal.

12. A method of operating an adjustable speed gas turbine power generation apparatus having a compressor for intaking and compressing air, a combustor for combusting fuel with the intake air to generate combustion gas, a gas turbine driven by the generated combustion gas, a fuel control device for controlling an amount of fuel to be supplied to the combustor in response to a load demand signal, a power generator having a primary winding connected to a power transmission system and a secondary winding which is excited with alternating current, wherein the generator is connected to said gas turbine by a drive shaft, the method comprising the steps:

controlling the rotational speed of the power generator in response to ambient temperature of the air and a load demand signal with an output of the gas turbine being maintained at substantially a rated output level at different ambient temperatures;

adjusting the speed of the power generator to operate in accordance with the equation fe=fo−f1 wherein fe is a slip frequency of the power generator equalling a frequency of excitation current applied by an alternating current excitation device to the secondary winding, fo equals the frequency of electrical current produced by the primary winding and f1 is the frequency of the drive shaft; and controlling the slip frequency fe of the alternating current excitation device as a function of the ambient temperature to increase with decreasing ambient temperature.

13. A method of operating an adjustable gas turbine power generation apparatus in accordance with claim 12 further comprising:

operating the compressor with an internal efficiency above 0.8.

14. A combined cycle system comprising:

a gas turbine power generation apparatus of the gas turbine power generator apparatus including a compressor for intaking and compressing air, a combustor for combusting fuel with the intake air from the compressor to generate combustion gas, a gas turbine driven by the generated combustion gas, a fuel control device for controlling an amount of fuel to be supplied to the combustor in response to a load demand signal, a power generator having a primary winding connected to a power transmission system and a secondary winding which is excited with alternating current;

a heat recovery steam generator for recovering heat discharged from the gas turbine power generation apparatus;

a steam turbine driven by a steam heated by the recovered heat from the heat recovery steam generator;

a second power generator driven by the steam turbine;

means for controlling the rotational speed of the power generator to adjust an output of the gas turbine in response to the load demand signal and ambient temperature of the air; and, a drive shaft connecting said power generator to the gas turbine; and wherein the power generator is an adjustable speed power generator operating in accordance with the equation fe=fo−f1 wherein fe is a slip frequency of the generator equalling a frequency of excitation current applied by the alternating current excitation device to the secondary winding, fo equals the frequency of electrical current produced by the primary winding and f1 is the frequency of the drive shaft, the alternating current excitation device controlling the slip frequency fe as a function of the ambient temperature to increase with decreasing ambient temperature.

15. The combined cycle system in accordance with claim 12 wherein:

the compressor operates with an internal efficiency above 0.8.

* * * * *